United States Patent
Finger et al.

(10) Patent No.: US 9,266,276 B2
(45) Date of Patent: Feb. 23, 2016

(54) SHAPING APPARATUS FOR THE SHAPING OF PLASTICS MATERIAL PRE-FORMS INTO PLASTICS MATERIAL CONTAINERS

(71) Applicant: Krones AG, Neurtaubling (DE)

(72) Inventors: Dieter Finger, Neutraubling (DE); Eduard Handschuh, Donaustauf (DE); Florian Geltinger, Donaustauf (DE); Klaus Voth, Obertraubling (DE)

(73) Assignee: Krones AG, Neutraubling (DK)

( * ) Notice: Subject to any disclaimer, the term of this patent is extended or adjusted under 35 U.S.C. 154(b) by 0 days.

(21) Appl. No.: 14/509,140

(22) Filed: Oct. 8, 2014

(65) Prior Publication Data

US 2015/0118342 A1    Apr. 30, 2015

(30) Foreign Application Priority Data

Oct. 30, 2013    (DE) .......................... 10 2013 111 950

(51) Int. Cl.
  *B29C 49/42*    (2006.01)
  *B29C 49/78*    (2006.01)
  *B29D 22/00*    (2006.01)
  B29C 49/12    (2006.01)
  B29C 49/06    (2006.01)
  B29C 49/36    (2006.01)

(52) U.S. Cl.
  CPC ........... *B29C 49/783* (2013.01); *B29C 49/4289* (2013.01); *B29D 22/003* (2013.01); *B29C 49/06* (2013.01); *B29C 49/36* (2013.01); *B29C 2049/129* (2013.01)

(58) Field of Classification Search
  CPC .............. B29C 49/4289; B29C 49/783; F16K 31/0679
  USPC ....................................................... 251/129.1
  See application file for complete search history.

(56) References Cited

U.S. PATENT DOCUMENTS 3,095,902 A * 7/1963 Caton ........................... 137/554
RE28,497 E * 7/1975 Gasmire ......................... 264/28
(Continued)

FOREIGN PATENT DOCUMENTS

DE    102010052903 A1    6/2012
EP    1271029 A1    1/2003
(Continued)

OTHER PUBLICATIONS

German Search Report in German Application No. 10 2013 11 950.6 dated Mar. 26, 2014.

*Primary Examiner* — Robert B Davis
(74) *Attorney, Agent, or Firm* — Oppedahl Patent Law Firm LLC

(57) ABSTRACT

The invention relates to a shaping apparatus (1) for the shaping of plastics material pre-forms (10) into plastics material containers (10A) with a plurality of blow moulding stations (8) and with at least one control device (55; 55A; 55B; 55C) for the control of blow molding pressures and/or volume flows at the blow molding stations (8), in which the at least one control device (55; 55A; 55B; 55C) comprises at least one control valve (56) with a control piston part (58) which is guided in a cylinder part (57) and by means of which a cross-section (59) of a blow molding air duct (60) is capable of being closed, wherein the control device (55; 55A; 55B; 55C) has a drive unit (61) operating in an electromagnetic manner in order to effect a change in position of the control piston part (58) inside the cylinder part (57) and thus also to control the blow molding pressures and/or volume flows at the blow molding stations (8).

11 Claims, 7 Drawing Sheets

(56) References Cited

U.S. PATENT DOCUMENTS

| | | | |
|---|---|---|---|
| 5,975,870 A * | 11/1999 | Remongin | 425/130 |
| 2010/0221470 A1 | 9/2010 | Derrien et al. | |
| 2012/0061596 A1* | 3/2012 | Hensel et al. | 251/65 |
| 2012/0141621 A1* | 6/2012 | Voth et al. | 425/149 |

FOREIGN PATENT DOCUMENTS

| | | |
|---|---|---|
| EP | 1306195 A2 | 5/2003 |
| EP | 1862230 A2 | 12/2007 |
| EP | 2474763 A1 | 7/2012 |
| WO | 2006/108382 A1 | 10/2006 |

* cited by examiner

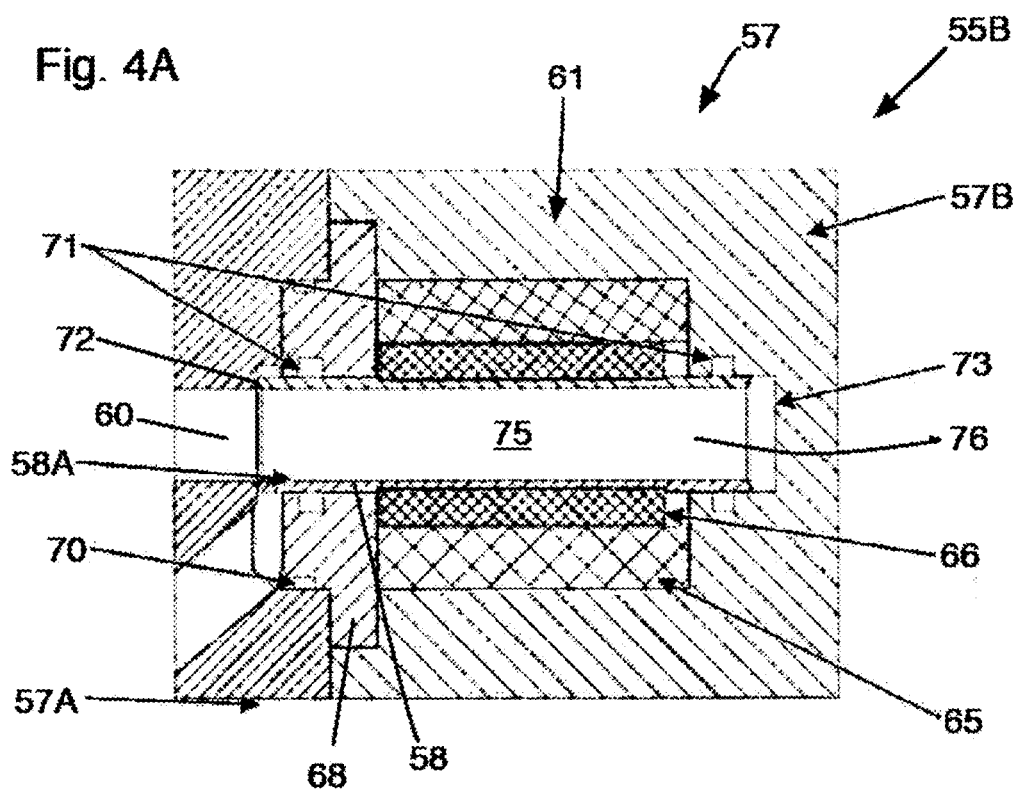
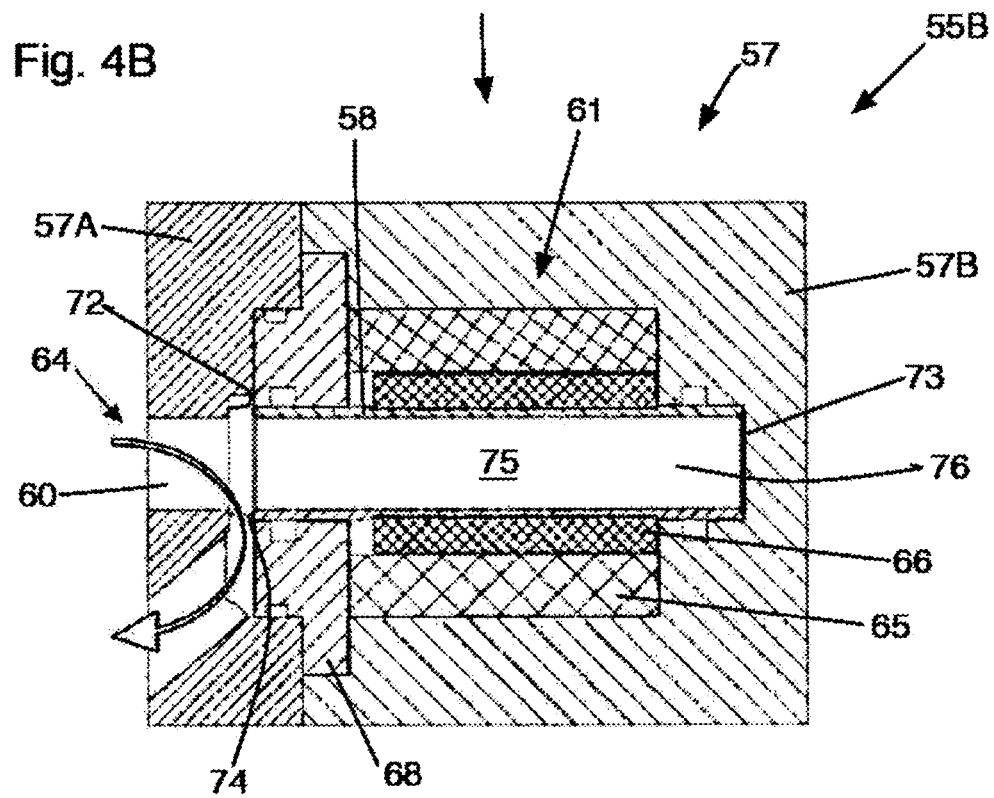

SHAPING APPARATUS FOR THE SHAPING OF PLASTICS MATERIAL PRE-FORMS INTO PLASTICS MATERIAL CONTAINERS

BACKGROUND

The invention relates to a shaping apparatus for the shaping of plastics material pre-forms into plastics material containers with a plurality of blow moulding stations and with at least one control device for the control of blow moulding pressures and/or volume flows at the blow moulding stations, in which the at least one control device comprises at least one control valve with a control piston part which is guided in a cylinder part and by means of which a cross-section of a blow moulding air duct is capable of being closed.

A generic shaping apparatus of this type is known for example from the Laid-Open Specification DE 10 2010 052 903 A1, in which is provided a control device for controlling a blow moulding pressure which has a control piston guided in a cylinder. The control piston can be moved in the direction of the longitudinal axis thereof by means of a pneumatic control pressure in order to close, in particular, a main flow path for the flow of blow moulding air.

A generic shaping apparatus with blow moulding stations arranged on a rotating blow moulding wheel for the blow moulding of containers from a thermoplastic material is likewise known from the patent specification EP 1 271 029 B1. This shaping apparatus comprises, in addition, a device for the pneumatic control of a blow moulding pressure, the device having a control piston which is guided in a cylinder and which can be displaced by means of a pneumatic control pressure in the direction of the longitudinal axis of the piston in such a way that, in particular, a main flow path for guiding blow moulding air is capable of being closed.

A drawback of known shaping apparatus of this type is that a change in position of the respective control piston for closing, and also for opening, a main flow path for the supply of blow moulding compressed air usually only takes place in a relatively undifferentiated manner. In particular, an unsatisfactory scatter of the valve switching times of up to +/−2 ms frequently occurs on account of the design, as a result of which the quality of the actual shaping process can be adversely affected.

It would be desirable to overcome at least the drawback named above on generic shaping apparatus.

SUMMARY OF THE INVENTION

A shaping apparatus is provided for the shaping of plastics material pre-forms into plastics material containers with a plurality of blow moulding stations and with at least one control device for the control of blow moulding pressures and/or volume flows at the blow moulding stations, in which the at least one control device comprises at least one control valve with a control piston part which is guided in a cylinder part and by means of which a cross-section of a blow moulding air duct is capable of being closed, the control device having a drive unit operating in an electromagnetic manner in order to effect a change in position of the control piston part inside the cylinder part and thus also to control the blow moulding pressures and/or volume flows at the blow moulding stations.

The control device has a drive unit operating in an electromagnetic manner, as a result of which a considerably more sensitive response behaviour and, in particular, also a considerably reduced reaction time with respect to the change in position of the control piston part which is arranged at least in part inside a cylinder base part of the cylinder part are achieved.

It is to be understood that effects in this respect could also be achieved by means of control valves controlled by means of modified control air. Pneumatically controlled control valves of this type, however, still need a relatively high consumption of control air. In the present case, however, it is possible to dispense with the use of control air of this type entirely, as a result of which a corresponding control air guidance system also need not be provided.

It is advantageous for a change in position capable of being set in a continuous manner also to be additionally achieved by means of the present control device, as a result of which blow moulding pressures can be produced in a still more differentiated manner on the shaping apparatus according to the invention. In this respect, it is also possible to dispense with a throttle valve which is otherwise necessary and by means of which the blow moulding compressed air was additionally throttled in a conventional manner.

The present control device therefore comprises not only a simple control valve but at the same time a throttle valve provided with a drive unit operating in an electromagnetic manner in order to control blow moulding pressures and/or volume flows.

Hitherto, with a conventional control valve capable of being actuated pneumatically it has been possible for the blow moulding pressure duct only to be closed in a completely pressure-tight manner or—with the aid of the actual blow moulding pressure of the blow moulding compressed air—to be opened again. There are only two positions in the case of a control valve capable of being actuated pneumatically.

With the drive unit operating in an electromagnetic manner, however, it is possible for the control piston to be capable of being displaced actively in a first direction (closure direction) and in a direction (open direction) opposite the first direction, without the aid of the actual blow moulding compressed air. As a result, the entire control device can be designed in a substantially simpler manner.

In addition, in the present case a stroke path length of the control piston part can be further set in a considerably variable manner. On conventional shaping apparatus the stroke path length of the control piston part can be regulated only with the aid of an additional piston stop capable of being set mechanically, since the corresponding control piston part can be moved pneumatically only between two switching positions, namely "open" and "closed". It is to be understood that a piston stop of this type has an adverse effect upon the structural design of the control valve.

In this respect it is advantageous for the drive unit operating in an electromagnetic manner to be arranged with respect to the control piston part in such a way that a variable stroke path length of the control piston part is capable of being produced by this drive unit operating in an electromagnetic manner.

An advantageous variant of embodiment provides that the drive unit operating in an electromagnetic manner comprises a measurement and detection unit by means of which the position of the control piston part and/or the change in position of the control piston part is or are capable of being determined.

By way of example, the drive unit operating in an electromagnetic manner can comprise a displacement sensor measurement element of the measurement and detection unit for determining the position of the control piston part with respect to the axial displacement axis, so that suitable information can be passed on to the control device and can be evaluated and processed there.

In particular, the blow moulding pressures and/or volume flows at the individual blow moulding stations can be produced in a still more differentiated manner as a result of this. In this way, it is advantageous for the measurement and detection unit to be provided, by means of which the position of the control piston part and/or the change in position of the control piston part is or are capable of being determined.

It is preferable for a control to take place in a manner combined by way of the force and path. In this context it is advantageous for a force/path pattern to be capable of being determined, recorded, visualized and analysed. In this respect it is advantageous for the measurement and detection unit additionally to have a force sensor measurement element.

If the control piston part comprises a tube piston element which, in particular, is arranged so as to be mounted in an axially displaceable manner inside a stator winding part of the drive unit operating in an electromagnetic manner, the control device can be made still more compact.

In addition, the masses to be accelerated on the control piston part can advantageously be reduced by the tube piston element. As a result, still more rapid reaction times can be achieved. Furthermore, the driving forces required can be reduced significantly by the use of the tube piston element, as a result of which not only the drive unit operating in an electromagnetic manner but the entire control device can be made correspondingly small.

The driving forces can be reduced still further if an axial displacement of the control piston part is assisted by means of a fluid. As a result, however, the structural outlay is again increased.

In principle, it is possible for at least the following driving variations to be used advantageously in conjunction with the drive unit operating in an electromagnetic manner, namely a drive operating in a purely electrical manner, a drive operating in an electrical and pneumatic manner, and a drive operating in an electrical manner with a mechanical or pneumatic gear transmission. In particular, in the case of the latter driving variation it can be advantageous for a mechanical transmission element to be interposed between the control piston part and the drive unit operating in an electromagnetic manner.

In addition, the driving forces can be reduced by an expedient choice of the materials coming directly into contact with each other with respect to guiding regions between the cylinder part and the control piston part. Pairs of materials can be regarded as being particularly advantageous in which the piston control part consists at least locally of metal and the cylinder part accordingly of plastics material, or vice versa.

The stator winding part is incorporated in the cylinder part in the present case in such a way that the control piston part or the rotor winding part thereof respectively is radially enclosed at least in part by the stator winding part along an axial displacement axis.

In addition, it is advantageous for the tube piston element to comprise a rotor winding part which forms the peripheral face of the control piston part at least in part.

By way of example, a coil region of the rotor winding part is attached to the peripheral face of the tube piston element radially on the outside. In this case the rotor winding part projects radially beyond this peripheral face of the tube piston element.

In the case of another arrangement the coil region of the rotor winding part can be inserted into the wall thickness of the tube piston element, so that the rotor winding part terminates radially flush with the tube piston element, as a result of which the diameter of the control piston part is not additionally increased by the rotor winding part.

In the case of another advantageous arrangement the rotor winding part alternatively comprises one or more permanent magnet elements which are arranged for example in the interior of the tube piston element.

For a satisfactory interaction with the stator winding part it is sufficient for the rotor winding part to extend at least in part over the longitudinal extension of the control piston part.

The control piston part provided with a corresponding rotor winding part can be realized in a particularly simple manner in structural terms if the rotor winding part per se forms the tube piston element. As a result, errors in assembly can also be prevented since the control piston part is made symmetrical.

The control piston part can be mounted in a highly precise manner along the axial displacement axis thereof if the control piston part is mounted so as to be axially displaceable on a guide bolt part of the cylinder part projecting into a tube piston element.

The guide bolt part preferably has no additional bore or the like in order to be able to ensure an optimum guidance of the blow moulding air.

Driving forces can be further reduced in an expedient manner if the control piston part has a pressure equalization chamber. A pressure equalization chamber of this type can be implemented in a particularly simple manner in structural terms by a tube piston element.

In particular, the control device can be equipped in a structurally simple manner with a 3/2-way control valve if the control piston part comprises two tube piston elements, in which case one of the two tube piston elements is arranged so as to be axially displaceable in the other of the two tube piston elements.

Driving forces can be further reduced if sealing faces acting in a sealing manner with respect to piston parts are produced from a softer or harder material than the piston parts.

A further simplification can be achieved if a plurality of control valves of at least one of the blow moulding stations are capable of being controlled by means of the control device.

A further variant of embodiment provides a central controller unit, by means of which a plurality of control devices are capable of being controlled. The individual control devices can be managed and addressed collectively by this central controller unit, as a result of which blow moulding pressures can be generated more uniformly at different blow moulding stations.

It is advantageous for reference movements of the control piston parts also to be capable of being carried out with the aid of the control device or the central controller unit respectively, in order to calibrate at least one end stop on the respective control valve.

Ideally a data exchange with respect to a stretch rod control of the shaping apparatus and the present control device can also take place by means of the advantageous central controller unit, so that the actuation of the stretch rod and the generation of the blow moulding pressure can be adjusted to each other in a particularly satisfactory manner.

It is to be understood that the drive unit operating in an electromagnetic manner can be attached to an existing energy supply network. In addition, an independent operation can be ensured at least for a time if the control device comprises an energy storage device for storing electrical energy. In particular, this can ensure that the respective control valve can still close securely in the event of a voltage failure, as a result of which the respective blow moulding station can change into an emergency mode.

A suitable electrical energy supply can advantageously take place on the shaping apparatus with a voltage of between 12 V and 80 V.

In addition, it is advantageous for a change in position of the control piston part to be carried out at least in part in a regenerative manner.

A further advantageous variant of embodiment provides that the blow moulding stations are arranged on a blow moulding wheel and the valve control takes place on the rotating blow moulding wheel. In other words, the control device controls the blow moulding pressures at the blow moulding stations by means of the present control valve while the blow moulding stations rotate with the blow moulding wheel about an axis of rotation of the blow moulding wheel.

Further advantages, aims and properties of the present invention are explained with reference to the accompanying drawing and the following description, in which a shaping device according to the invention is illustrated and described by way of example in conjunction with control devices designed in different ways and the structural components thereof.

DESCRIPTION OF THE DRAWING

In the drawing:

FIG. 4A is a diagrammatic longitudinal sectional view of a closed further blow moulding pressure control valve;

FIG. 4B is a further diagrammatic longitudinal sectional view of the opened further blow moulding pressure control valve as shown in FIG. 4A;

DETAILED DESCRIPTION

Figure 1:
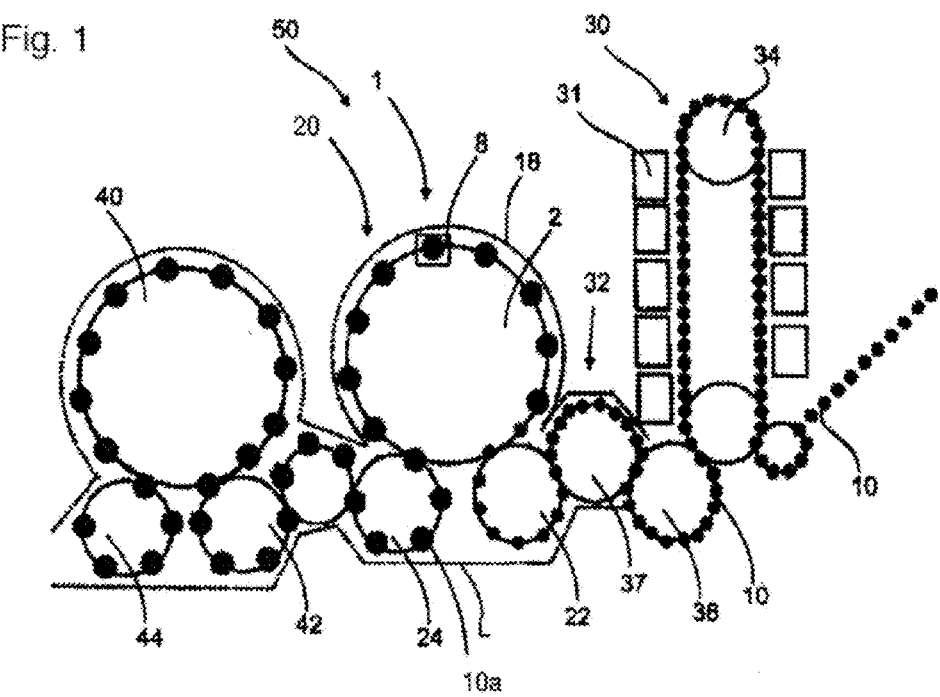
FIG. 1 is a diagrammatic view of a plant for the production of plastics material containers comprising a shaping apparatus arranged in a clean room and with a control device having a drive unit operating in an electromagnetic manner in order to control a continuous change in position of a control piston part inside a cylinder part of a blow moulding pressure control valve.

A diagrammatic illustration of a plant 50 for the production of plastics material containers 10a is given in FIG. 1. This plant 50 has a heating device 30 in which the plastics material pre-forms 10 are heated. In this case these plastics material pre-forms 10 are conveyed through this heating device 30 by means of a conveying device 34, such as a circulating chain here, and are heated by a plurality of heating elements 31 in this case. This heating device 30 is adjoined by a transfer unit 36 which transfers the plastics material pre-forms 10 to a sterilization device 32. This sterilization device 32 likewise has in this case at least one conveying wheel 37, and sterilization elements can be arranged on this conveying wheel 37 or even so as to be stationary. In this region a sterilization by hydrogen peroxide gas or even, as mentioned above, by electromagnetic or UV radiation respectively, is possible for example. In particular, an internal sterilization of the plastics material pre-forms 10 is carried out in this region. It is preferable for an internal and external sterilization of the plastics material pre-forms to be carried out in the sterilization device.

The reference number 20 designates in its entirety a clean room, the external boundaries of which are indicated in this case by the broken line L. In a further preferred embodiment the clean room 20 is not only arranged in the region of the conveying wheel 2 and a filling device 40, but it possibly already begins in the region of the heating device 30, the sterilization device 32, the supply of the plastics material pre-forms and/or the production of the plastics material pre-forms. It will be noted that this clean room 20 begins in the region of the sterilization unit 32. Lock devices can be provided in this region in order to introduce the plastics material pre-forms 10 into the clean room 20, without too much gas flowing out of the clean room 20 during this and being lost in this way.

As indicated by the broken line L, the clean room 20 is adapted to the external shape of the individual components of the plant. In this way, the volume of the clean room 20 can be reduced.

The reference number 1 designates in its entirety a shaping apparatus for the shaping of plastics material pre-forms 10 into plastics material containers 10A, in which a plurality of blow moulding stations 8 are arranged on a conveying wheel 2, in which case (see FIG. 2) only one of these blow moulding stations 8 is illustrated in greater detail. The plastics material pre-forms 10 are expanded by these blow moulding stations 8 to form the plastics material containers 10A. Although it is not shown in greater detail here, the entire region of the conveying device 2 is not situated inside the clean room 20, but the clean room 20 or isolator respectively is implemented as it were in the form of a mini isolator inside the shaping apparatus 1 as a whole. In this way, it would be possible for the clean room 20 to be designed in the manner of a duct at least in the region of the shaping apparatus 1.

The reference number 22 refers to a supply device which transfers the plastics material pre-forms 10 to the shaping apparatus 1, and the reference number 24 refers to a removal device which removes the finished plastics material containers 10A from the shaping apparatus 1. It will be noted that in the region of the supply device 22 and the removal device 24 the clean room 20 has recesses in each case which receive these devices 22, 24. In this way, a transfer of the plastics material pre-forms 10 to the shaping apparatus 1 or a transfer of the plastics material containers 10A from the shaping apparatus 1 respectively can be achieved in a particularly advantageous manner.

The expanded plastics material containers 10A are transferred to a filling device 40 by a transfer unit 42 and they are then removed from this filling device 40 by way of a further conveying unit 44. In this case the filling device 40 is also situated inside the aforesaid clean room 20. In addition, in the case of the filling device 40 it would be possible not for the entire filling device 40 with for example a reservoir for a beverage to be arranged completely inside the clean room 20, but also in this case only those areas in which the plastics material containers 10A are actually guided. In this respect the filling device 40 could also be designed in a manner similar to the shaping apparatus 1 for the shaping of the plastics material pre-forms 10.

As mentioned, the clean room 20 is reduced in the region of the shaping apparatus 1 to as small an area as possible, namely substantially to the blow moulding stations 8 themselves. On account of this compact design of the clean room 20 it is possible in an easier and more rapid manner to produce a clean room 20 in general and, in addition keeping the system sterile in the operating phase is less complicated. In addition, less sterile air is required, and this leads to smaller filter plants and the risk of uncontrolled swirl formation is also reduced.

In addition, a stressing device (not shown further in this case) can also be provided, which is used for acting, in particular, upon the blow moulding stations 8 with the flowable sterilization agent. This stressing device can be situated on the conveying wheel 2 or on the stationary wall 18 or in general in a stationary manner and can have nozzles or the like. In addition, it may be advantageous for sterile air and/or sterilization medium for the sterilization of the clean room 20 to be introduced into the clean room 20 by way of the aeration system. As an alternative or in addition, however, it would also be possible for the stressing device to be a device which acts upon the blow moulding stations 8 with radiation (in particular electromagnetic), for example UV or electron radiation. In this case it would be advantageous for at least one region of the sealing device to be capable of being reached by this electromagnetic radiation in an assembled state of the components. The reference letter U shown in FIG. 2 refers to a (non-sterile) environment of the clean room 20.

Figure 2:
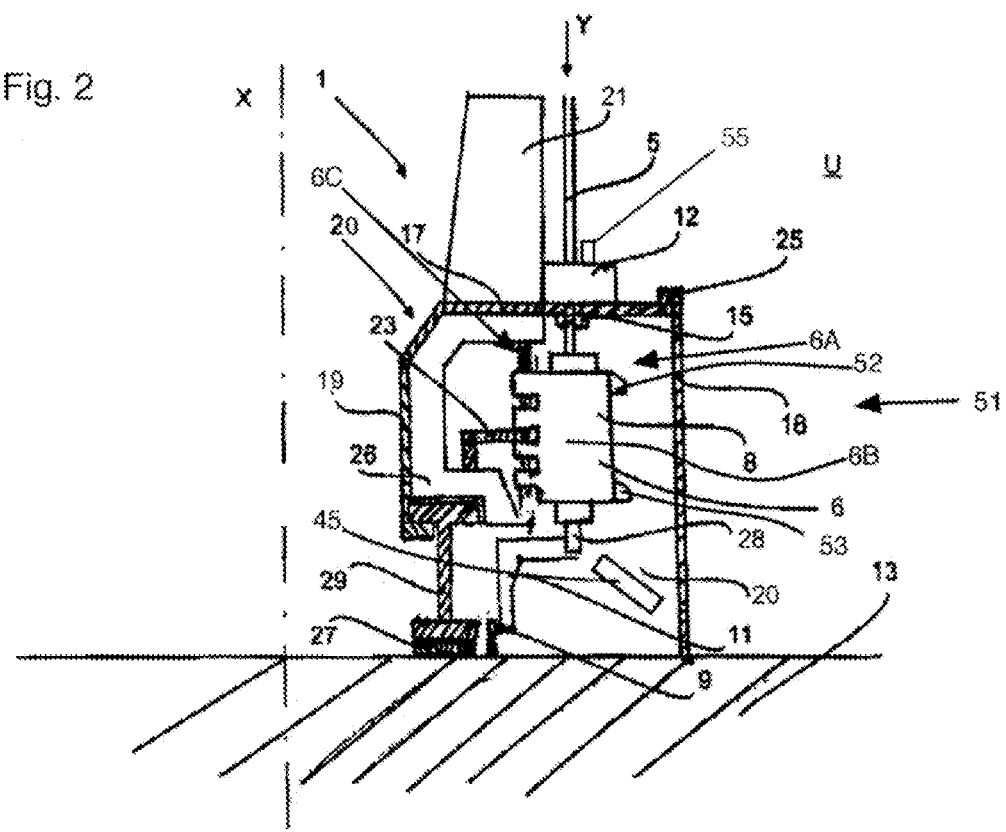
FIG. 2 is a detailed diagrammatic view of one of the blow moulding stations of the shaping apparatus as shown in FIG. 1.

FIG. 2 is a detailed illustration of the shaping apparatus 1 in the region of one of the blow moulding stations 8. A plurality of blow moulding stations 8 of this type are moved in a manner rotating about an axis X or axis of rotation of the blow moulding wheel respectively by a conveying device 2 (i.e. the carrier 2). As is evident from FIG. 2, the blow moulding station 8 is guided inside the clean room 20 which in this case is designed in the manner of a duct. This clean room 20 is closed off by a movable lateral wall 19 and a cover 17 formed in one piece with this lateral wall 19. This lateral wall 19 and the cover 17 rotate jointly with the blow moulding station 8 in this case.

The reference number 18 refers to a further wall which bounds the clean room 20. This wall 18 in this case is a wall which is situated on the outside and which is arranged in a stationary manner. Between the cover 17 and the wall 18 is provided a sealing device 25 which seals off from each other the elements 17 and 18 which are movable with respect to each other, for example, as mentioned above, with the use of a surge chamber. The lower region of the wall 18 is arranged in a fixed and sealed manner on a base 13. A carrier 26, which likewise moves in a rotating manner and on which in turn is provided a holding device 23 which holds the blow moulding station 8, is provided inside the clean room 20 and resting directly against the wall 19 in this case.

The reference number 45 in this case designates a further stressing device which is used for acting upon the shaping stations with the flowable sterilization agent. This stressing device 45 can be situated on the conveying wheel 2 or on the stationary wall 18 or in general in a stationary manner and can have nozzles or the like. In addition, it is advantageous for sterile air for the sterilization of the clean room 20 to be introduced into the clean room 20 by way of the aeration system.

As an alternative or in addition, however, it would also be possible for the stressing device 45 to be a device which acts upon the shaping stations with (in particular electromagnetic) radiation, for example UV or electron radiation. In this case it would be advantageous for at least one region of the sealing device to be capable of being reached by this electromagnetic radiation in an assembled state of the components.

The reference number 11 refers to a follower device which can be actuated by a guide cam 9 in order to open and close the blow moulding station 8 on its path through the clean room 20, in order, in particular, to insert the plastics material pre-form 10 into the blow moulding station 8 and in order also to remove it again. In this case a guide cam 9 is also arranged inside the clean room 20. It would also, however, be possible for example for a portion 28 to be removed from the clean room 20 below the individual blow moulding stations 8.

The carrier 26 is arranged on a holding member 29 in a fixed manner in this case and this holding member 29 is in turn movable with respect to the base 13. In this case the reference number 27 refers to a further sealing device which in this region also effects a sealing of the regions 13 and 29 which are movable with respect to each other.

The reference number 5 refers to a stretch rod element which is movable with respect to the blow moulding station 8, in order to stretch the plastics material pre-forms 10 in the longitudinal direction thereof. In this case a slide 12, opposite which the stretch rod element 5 is movable in the stretching direction Y, is arranged on the cover 17 here. The reference number 21 refers to a further holding means for this slide 12 of the stretch rod element 5.

It will be noted that during the blow moulding procedure specific regions of the stretch rod element 5 are arranged both outside the clean room 20 and inside the clean room 20. For this purpose it is possible for a protection device such as a folding bellows, which surrounds the stretch rod element 5, to be provided outside the clean room 20 or above the slide 12 respectively, so that no region of the stretch rod element 5 comes directly into contact with the ambient environment.

The shaping apparatus 1 is characterized by a two-part blow mould 6 which is held on a first and a second blow mould part carrier 6A and 6B, the two blow mould part carriers 6A and 6B having a common pivot shaft 6C.

The two-part blow mould 6 is held closed during a blow moulding procedure by means of a locking device 51 with two locking elements 52 and 53.

In order to be able to act upon the respective two-part blow mould 6 with suitable blow moulding pressure stages during a blow moulding procedure, the shaping apparatus 1 comprises a control device 55 according to the invention for controlling the respective blow moulding pressure at the respective blow moulding station 8. In this embodiment a control device 55 of this type is provided on each of the blow moulding stations 8.

Figure 5:
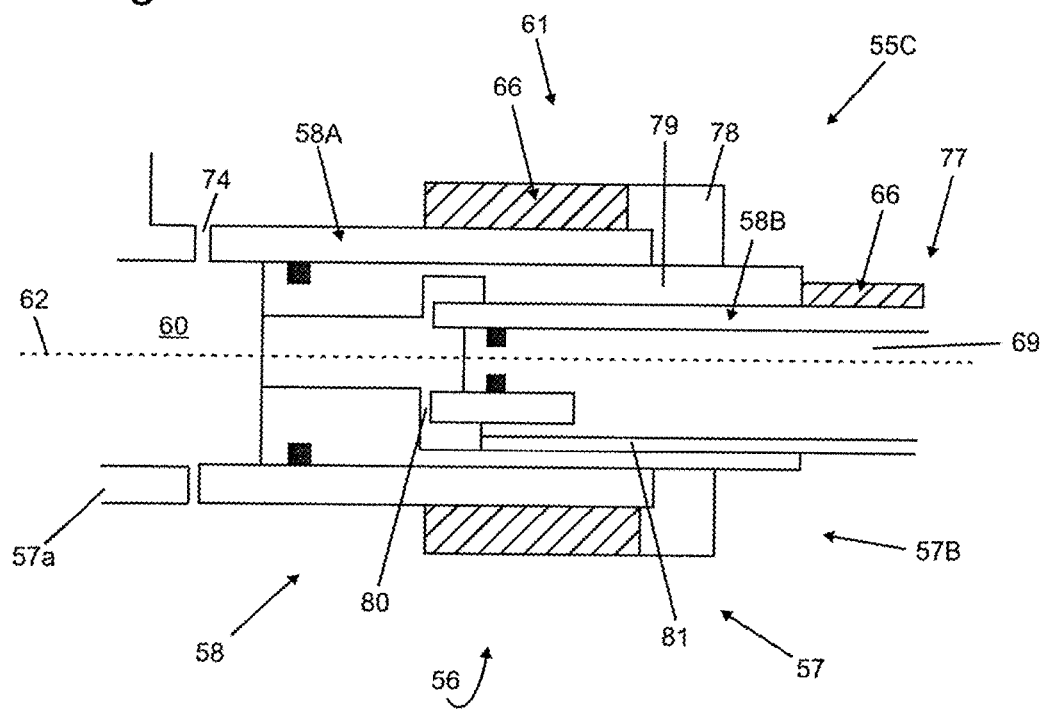
FIG. 5 is a diagrammatic longitudinal sectional view of another blow moulding pressure control valve in the form of a 3/2-way control valve.

In the drawings of FIGS. 3 to 5, first examples of control devices 55A, 55B and 55C of different design are shown.

Components which in particular correspond at least substantially with respect to the function thereof in the individual figures are designated in the present case with the same reference numbers, it being unnecessary for these components to be numbered and explained in all the figures.

Figure 3A:
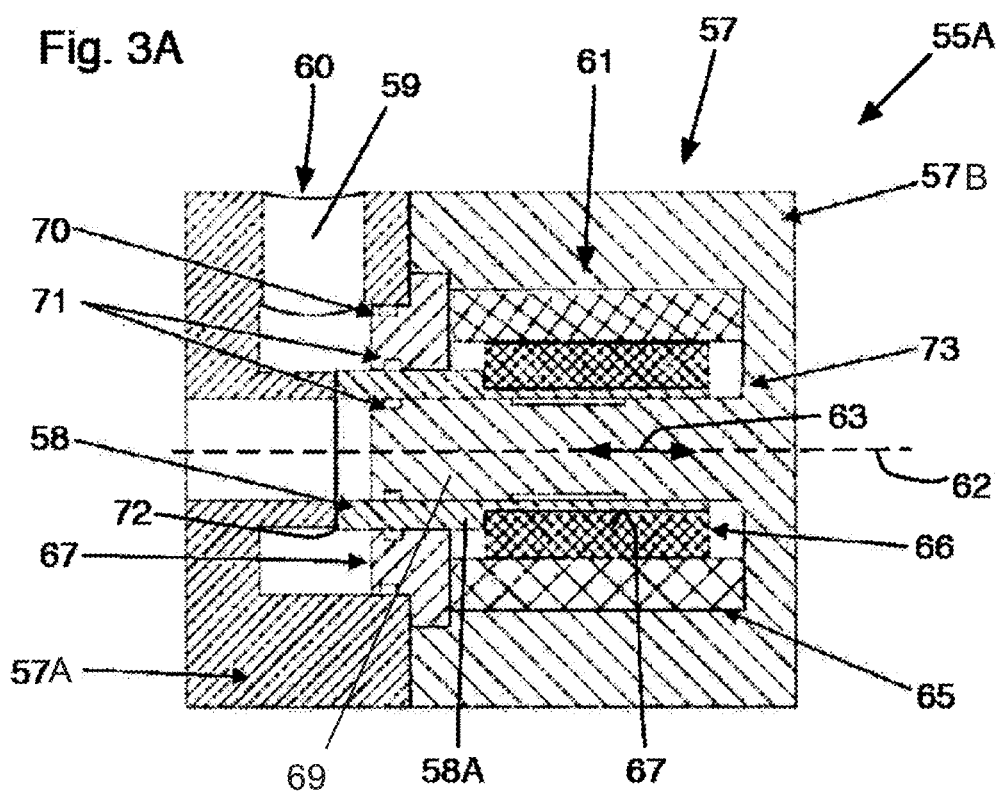
FIG. 3A is a diagrammatic longitudinal sectional view of a closed first blow moulding pressure control valve.
Figure 3B:
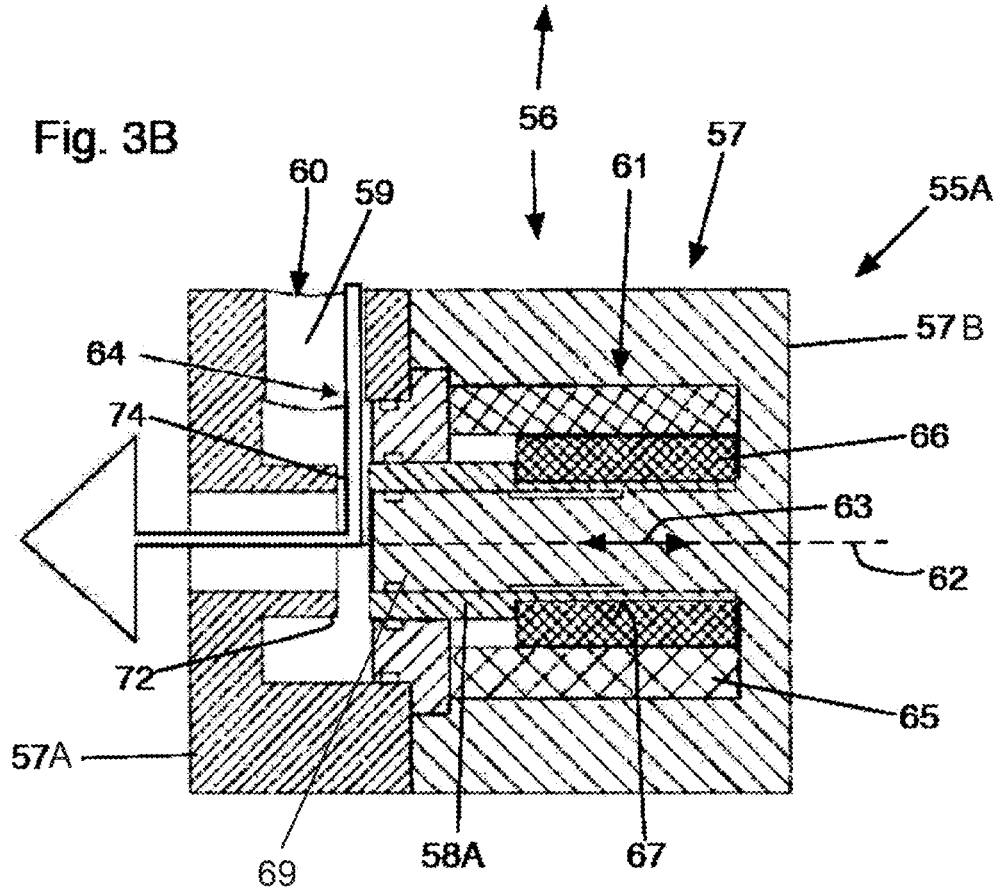
FIG. 3B is a further diagrammatic longitudinal sectional view of the opened first blow moulding pressure control valve as shown in FIG. 3A.

All the control devices 55, 55A, 55B and 55C shown in FIGS. 2 to 5 comprise a blow moulding pressure control valve 56 which comprises a control piston part 58 which is guided in a cylinder part 57—which forms a control valve housing (not numbered explicitly)—and by means of which a cross-section 59 of a blow moulding air duct 60 can be altered at least locally, i.e. closed (see FIGS. 3A, 4A) or opened (see FIGS. 3B, 4B, 5).

The blow moulding air duct 60 is formed in this case in a cylinder head part 57A of the cylinder part 57 which is flange-mounted on the head side on a cylinder base part 57B of the cylinder part.

Each of the control devices 55, 55A, 55B and 55C has at least one drive unit 61 operating in an electromagnetic manner in order to produce a change in position of the control piston part 58 along an axial displacement axis 62 inside the cylinder part 57 and, in this way, also to control the blow moulding pressures at the blow moulding stations 8. As a result, the control devices 55, 55A, 55B and 55C can be designed in an extremely compact manner on the one hand and the control piston part 58 can nevertheless be displaced in a particularly exact and quickly reacting manner along the axial displacement axis 62 on the other hand, as a result of which the blow moulding pressure control valve 56 can be opened and closed with a high degree of precision.

In order to reduce substantially the driving forces for the displacement of the control piston part 58, it comprises a tube piston element 58A, as a result of which the control piston element 58 has a lighter design as a whole and it can also be axially pushed or displaced respectively along the axial displacement axis 63 more easily.

In addition, by means of the drive unit 61 operating in an electromagnetic manner it is possible to displace the control piston part 58 with a variable stroke path length 63, so that the blow moulding pressure control valve 56 can also be used as a throttle valve in order to be able to throttle, virtually in any desired manner, a volume flow 64 of the blow moulding compressed air conveyed through the blow moulding air duct.

The drive unit 61 operating in an electromagnetic manner is formed essentially by a stator winding part 65, which is inserted in a stationary manner into the cylinder base part 57B of the control valve 56, and by a rotor winding part 66, which is fastened to the control piston part 58.

The control piston part 58 is guided radially on the outside by means of its rotor winding part 66 on the stator winding part 65. The rotor winding part 66 forms at least in part the peripheral face 67 of the control piston part 58.

In addition, a further guide ring part 68 for the control piston part 58, on which the control piston part 58 is additionally guided radially on the outside, is arranged between the cylinder base part 57B and the cylinder head part 57A.

Furthermore, in the case of the control device 55A shown in FIGS. 3A and 3B the control piston part 58 is additionally guided or mounted respectively radially on the inside on a guide bolt part 69 projecting and, in particular, also extending into the tube piston element 58A.

The guide ring part 68 and the guide bolt part 69 are further sealed off with respect to the cylinder head part 57A and the control piston part 58 by an external O-ring seal 70 and by two seals 71 arranged radially further inside respectively, so that no blow moulding compressed air can escape to the cylinder base 57B and into the environment.

In accordance with the illustration according to FIG. 3A the control valve 56 is closed, i.e. the control piston part 58 is pushed completely in the direction of the cylinder head part 57A and is struck against a tube piston element seat 72, so that the blow moulding air duct 60 is closed, in particular, by the tube piston element 58A of the control piston part 58.

In accordance with the illustration according to FIG. 3B, however, the control valve 56 is opened, the control piston part 58 being pushed against a stop face 73 provided on the cylinder base part 57B. As a result, a through-opening 74 closed beforehand (see FIG. 3B) of the blow moulding air duct 60 is released, so that the volume flow 64 of the blow moulding compressed air can flow through the blow moulding compressed air duct 60 and further into the respective blow mould 6, in order to expand the plastics material preform 10 introduced therein beforehand to form the plastics material container 10A.

The control device 55B shown in FIGS. 4A and 4B likewise has a blow moulding pressure control valve 56 with a cylinder part 57 comprising a cylinder head part 57A and a cylinder base part 57B, in which a control piston part 58 with a tube piston element 58A is mounted so as to be displaceable along an axial displacement axis 62.

According to the invention the control piston part 58 is again driven by a drive unit 61 which operates in an electromagnetic manner and which essentially comprises a stator winding part 65 positioned in the cylinder base part 57B and a rotor winding part 66 arranged radially on the outside on the control piston part 58.

The tube piston element 58A is again guided radially on the outside on the stator winding part 65 and on a guide ring part 68 fastened between the cylinder base part 57B and the cylinder head part 57A.

This guide ring part 68 is sealed off from the cylinder head part 57A by an outer O-ring seal 70. The control piston part 58 is sealed off from the guide ring part 68 and the cylinder base part 57B by two internal seals 71. This prevents a volume flow 64 of the blow moulding compressed air, which when the control valve 56 is opened flows through a blow moulding compressed air duct 60 introduced into the cylinder head part 57A, from being able to escape into areas of the cylinder base part 57B.

In contrast to the control device 55A shown in FIGS. 3A and 3B, the guide bolt part 69 (see FIG. 3) is dispensed with in the case of the control device 55B, so that a cavity 75 for a pressure equalization chamber 76 is formed inside the tube piston element 58A. The driving forces to be exerted by the drive unit 61 operating in an electromagnetic manner can be further reduced advantageously by this tube piston element 58A equalized with respect to the blow moulding pressure.

In accordance with the illustration according to FIG. 4A the control valve 56 of the control device 55B is closed, i.e. the control piston part 58 is pushed completely in the direction of the cylinder head part 57A and is struck against a tube piston element seat 72, so that the blow moulding compressed air duct 60 is closed, in particular, by the tube piston element 58A of the control piston part 58.

In accordance with the illustration according to FIG. 4B the control valve 56 is opened, the control piston part 58 being pushed against a stop face 73 provided on the cylinder base part 57B. As a result, a through-opening 74 closed beforehand (see FIG. 4B) of the blow moulding compressed air duct 60 is released, so that the volume flow 64 of the blow moulding compressed air can pass through the blow moulding compressed air duct 60 and can flow further into the respective blow mould 6, in order to expand the plastics material pre-form 10 introduced therein beforehand to form the plastics material container 10A.

The further control device 55C shown in FIG. 5 has a control piston part 58 which in contrast to the control devices 55A and 55B described above (FIGS. 3 and 4 respectively) comprises two tube piston elements 58A and 58B, in which case the inner tube piston element 58B of the two tube piston elements 58A, 58B is arranged so as to be axially displaceable in the outer tube piston element 58A of the two tube piston elements 58A and 58B.

In this case the outer tube piston element 58A has associated with it a first drive unit 61 operating in an electromagnetic manner and the inner tube piston element 58B has associated with it a further drive unit 77 operating in an electromagnetic manner. In this respect corresponding rotor winding parts 66 are mounted on the tube piston elements 58A and 58B on the outside.

The control device 55C likewise has a cylinder part 57, the cylinder head part 57A and the cylinder base part 57B of which are illustrated only in outline in FIG. 5. The cylinder base part 57B has an outer component 78 and an inner component 79, the outer tube piston element 58A being guided in an axially displaceable manner radially on the outside on the inner component 79 and the inner tube piston element 58B being guided in an axially displaceable manner radially on the inside on the inner component 79. The outer tube piston element 58A is also guided in an axially displaceable manner radially on the outside, in particular with the rotor winding part 66 thereof, on a stator winding part (not shown here) of the first drive unit 61 operating in an electromagnetic manner. The inner tube piston element 58B is additionally guided in an axially displaceable manner on the inside by a guide bolt part 69.

In every case a through-opening 74 of a blow moulding air duct 60 for a first blow moulding air pressure can be closed by means of the outer tube piston element 58A and a further through-opening 80 of a further blow moulding air duct 81 for a further blow moulding air pressure can be closed by means of the inner tube piston element 58B; or the further through-opening 80 for the first pressure stage and the blow moulding pressure duct 60 for the second pressure stage; or the further through-opening 80 for one pressure stage and the blow moulding pressure duct 60 for release as an exhaust valve.

In this respect it is possible also to create at the blow moulding station 8 a 3/2-way control valve 56A in a structurally simple manner without a control air device by way of which different blow moulding pressures can advantageously be made available for shaping a plastics material pre-form 10 into a plastics material container 10A directly on a shaping apparatus 1 or on a shaping apparatus 1 respectively.

Figure 6:
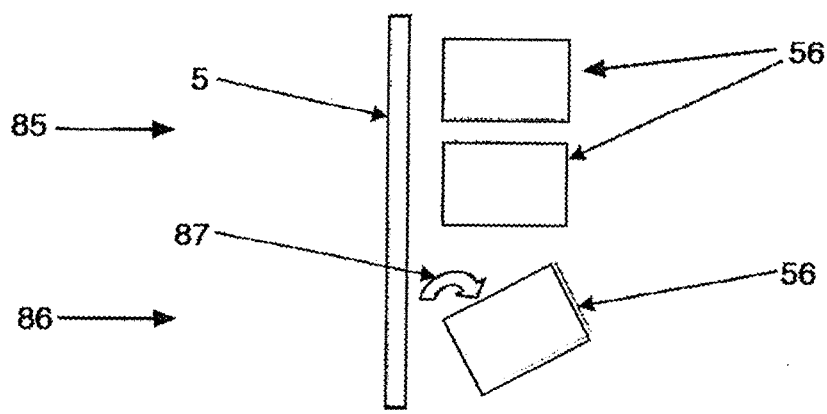
FIG. 6 is a diagrammatic view of different arrangements between a stretch rod and blow moulding pressure control valves.

In the illustration reproduced in FIG. 6, various arrangements 85 and 86 are illustrated, in which advantageous angular orientations of blow moulding pressure control valves 56 with respect to the stretch rod element 5 are illustrated by way of example.

In the case of the upper arrangement 85 the two blow moulding pressure control valves 56 are aligned orientated vertically or parallel to the stretch rod element 5 respectively.

In the case of the lower arrangement 86 the blow moulding pressure control valve 56 is arranged inclined at an angle of 45° with respect to the stretch rod element 5.

In particular, the blow moulding pressure control valves 56 can be incorporated, advantageously arranged at angles 87 of between 0° and 180° with respect to the stretch rod element 5, in a shaping device 1.

Figure 7A:
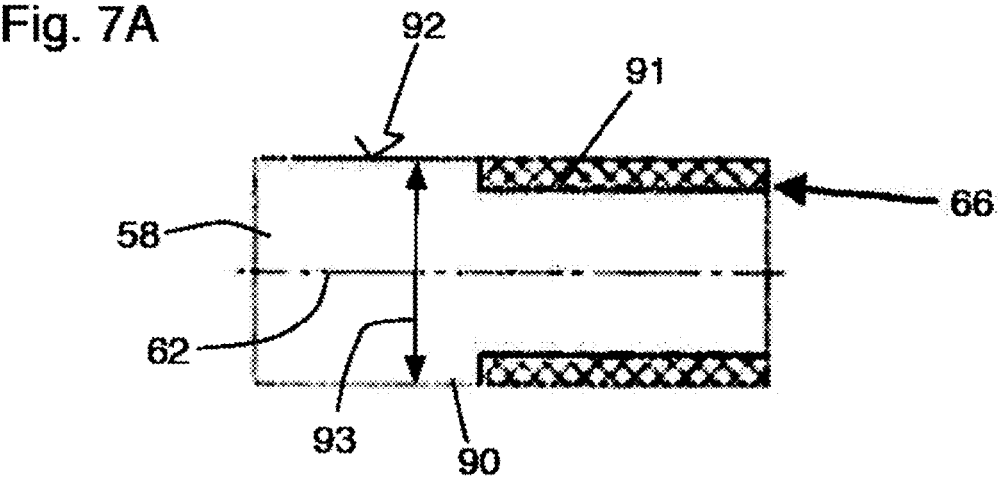
FIG. 7A is a diagrammatic view of a first rotor winding part arrangement on a tube piston element of a control piston part.

In the case of the control piston part 58 shown in FIG. 7A the rotor winding part 66 is arranged on an offset 91 formed in the wall 90 of the tube piston element 58A in such a way that the rotor winding part 66 terminates level with the external peripheral face 92. As a result, the rotor winding part 66 does not increase the external diameter 93 of the control piston part 58 as a whole.

Figure 7B:
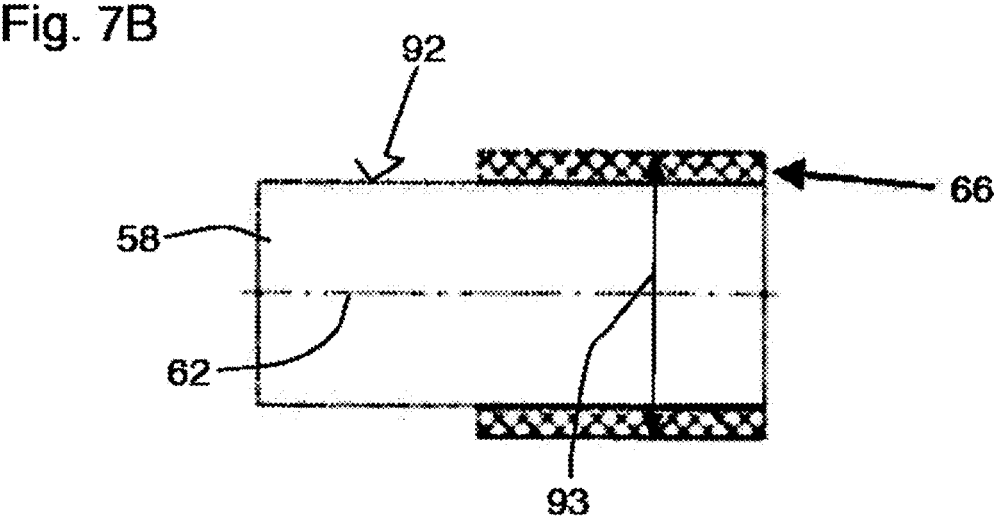
FIG. 7B is a diagrammatic view of a second rotor winding part arrangement on a tube piston element of a control piston part.

In the case of the control piston part 58 shown in FIG. 7B the rotor winding part 66 is alternatively arranged positioned on the external peripheral face 92. As a result, however, the rotor winding part 66 increases the external diameter 93 of the control piston part 58 as a whole.

Figure 7C:
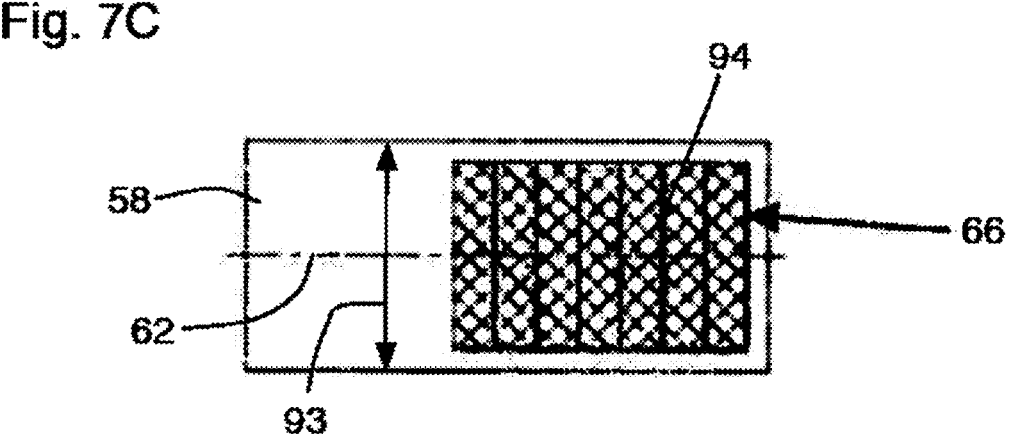
FIG. 7C is a diagrammatic view of a further rotor winding part arrangement on a tube piston element of a control piston part.

In the case FIG. 7C the control piston part 58 is provided with a permanent magnet element 94 as a rotor winding part 66 which is fastened in the interior of the tube piston element 58A. In this way, the actual external diameter 93 of the tube piston element 58A is not increased by the rotor winding element 66.

Figure 8A:
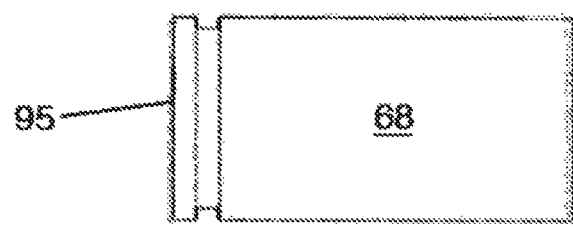
FIG. 8A is a diagrammatic view of a first guide bolt part with a plane head side.

The guide bolt part 68 shown in FIG. 8A has a plane head side 95 which forms part of a blow moulding air duct 60.

Figure 8B:
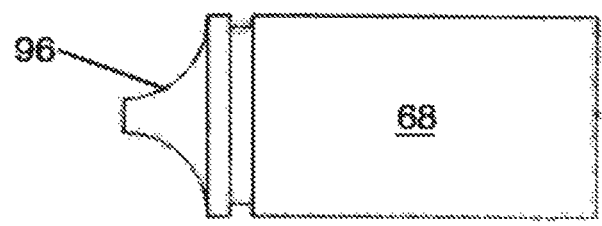
FIG. 8B is a diagrammatic view of a further guide bolt part with a contoured head side.

The alternative guide bolt part 68 shown in FIG. 8B has a contoured head side 96 for an optimized blow moulding air flow in a blow moulding air duct 60 shaped in a corresponding manner.

Figure 9:
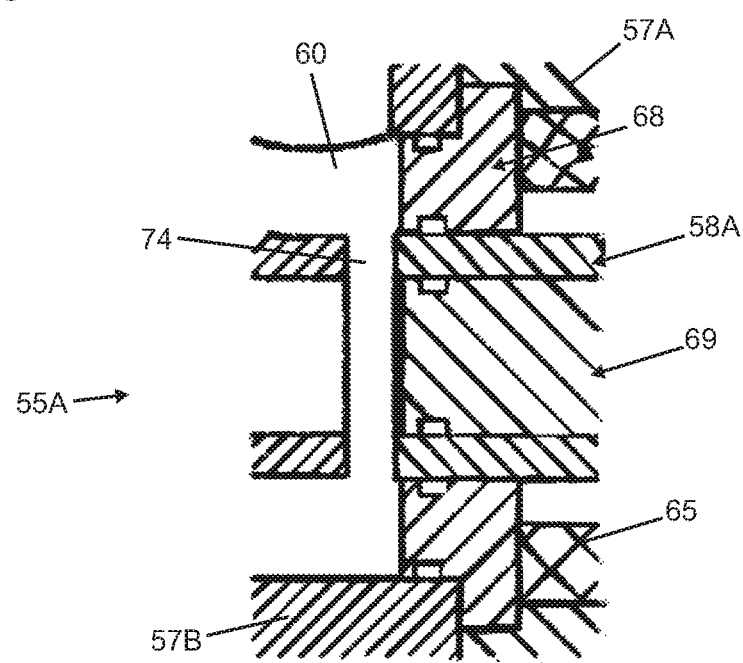
FIG. 9 is a diagrammatic partial view of the control device shown in FIG. 3.

In the case of the control device 55A shown only in a cut-away view in FIG. 9 (cf. FIG. 3) a preferred pairing of materials with respect to the components movable with respect to each other, such as for example the tube piston element 58A of the control piston part 58, the guide bolt part 69 and the guide ring part 68, are explained by way of example.

In the case of a first advantageous pairing of materials by way of example the tube piston element 58A is produced from a plastics material and the guide bolt part 69 and the guide ring part 68 are produced in each case from metal.

In the case of an alternative advantageous pairing of materials the tube piston element 58A can consist of metal and the guide bolt part 69 and the guide ring part 68 can consist in each case of a plastics material.

Other pairings of materials can naturally also be used with advantage in order to obtain advantageous frictional values between the components movable with respect to one another, as a result of which the necessary driving forces which have to be exerted by the drive unit 61 operating in an electromagnetic manner can in turn be reduced.

It should be explicitly mentioned at this point that sealing faces can advantageously be produced from a material which is softer or harder than that of the pistons.

Figure 10A:
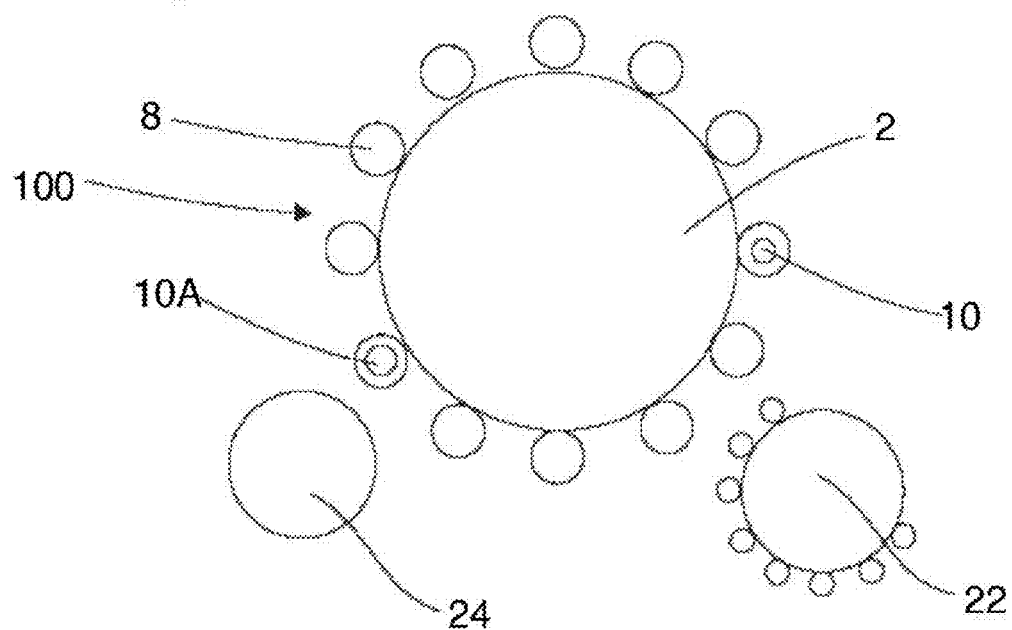
FIG. 10A is a diagrammatic view of an alternative arrangement with a shaping apparatus not arranged in a clean room and with a control device having a drive unit operating in an electromagnetic manner in order to control a continuous change in position of a control piston part inside a cylinder part of a blow moulding pressure control valve.

FIG. 10*a* is a diagrammatic illustration of an alternative arrangement 100 with a shaping apparatus 1 for the shaping of plastics material pre-forms 10 into plastics material containers 10A. In this case the plastics material pre-forms 10 are fed to a plurality of shaping stations 8 by way of a supply device 22, such as for example a supply star wheel. These shaping stations 8 are arranged in this case on a rotatable carrier. During the conveying thereof along a conveying path the plastics material pre-forms 10 are expanded to form the plastics material containers 10*a*. The plastics material containers 10*a* expanded in this way are removed from the conveying wheel 2 again by way of a removal device 24 and are conveyed further. The conveying wheel 2, the supply device 22 and/or the removal device 24 can be conveying star wheels in each case.

Figure 10B:
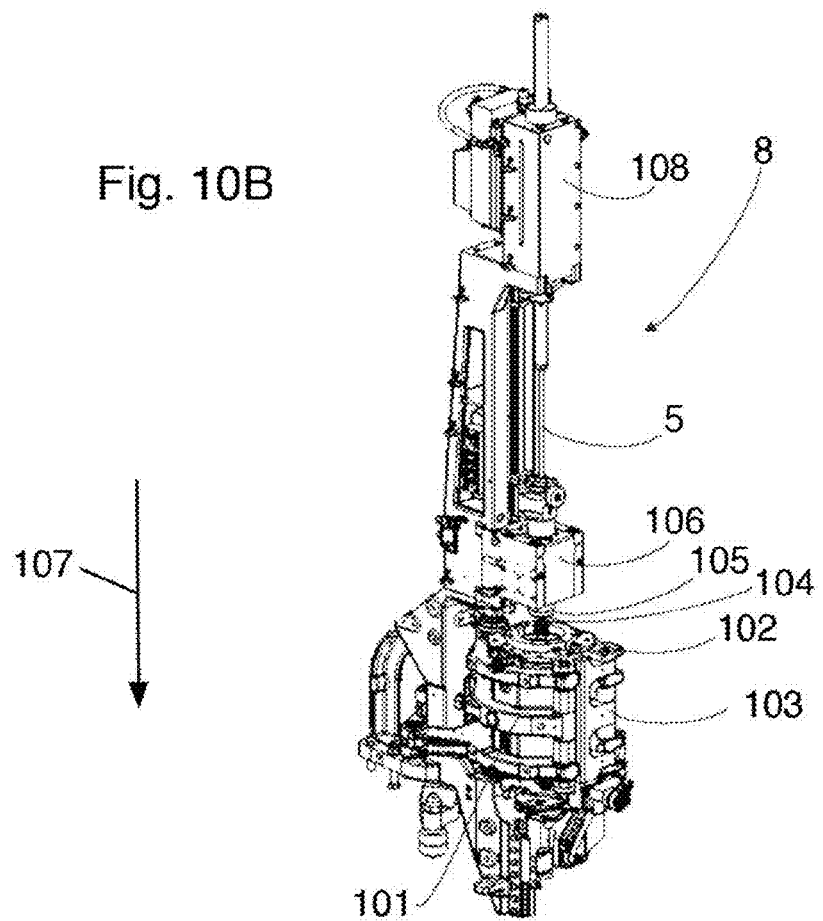
FIG. 10B is a detailed diagrammatic view of one of the blow moulding stations of the shaping apparatus as shown in FIG. 10A.

FIG. 10B is an illustration of an individual shaping station 8. This shaping station 8 has in this case a blow moulding device in which two lateral parts 101 and 102 are shown here, which can be pivoted with respect to each other about an axis which is at a right angle to the conveying path of the plastics material containers 10a. As a result of this procedure, plastics material pre-forms 10 can be introduced into this blow moulding arrangement and can be expanded by means of blow moulding air. The reference number 103 designates a locking device for locking the two blow mould parts to each other.

For expansion purposes, a blow moulding nozzle 104 is placed on the plastics material pre-forms 10 or part of the blow mould 6, in order to be able to act upon the latter with compressed air in this way. This blow moulding nozzle 104 is arranged in this case on a blow moulding piston 105 illustrated only in part. The reference number 106 designates a valve block in which a plurality of valves are arranged in order to control the stressing of the plastics material pre-forms 10 at different pressure levels.

The reference number 5 designates a stretch rod element which is capable of being introduced into the interior of the plastics material pre-forms 10, in order to stretch the latter in the longitudinal direction 107 thereof during the expansion thereof. The reference number 108 designates a corresponding drive, such as a linear motor, which controls the movement of the stretch rod element 5 in this longitudinal direction 107. In addition, it is also possible for the blow moulding piston 105 likewise to be moved in this longitudinal direction 107, which can be carried out by means of guide cams for example.

The shaping apparatus 1 shown in FIGS. 10A and 10B is not present in a clean room, but it is provided with a control device which has a drive unit 61 or 77 respectively operating in an electromagnetic manner, in order to effect a change in position of the control piston part 58 inside the cylinder part 57 and thus also to control the blow moulding pressures and/or volume flows at the shaping stations 8, as already explained in detail above. In order to avoid repetition, reference is therefore made to the foregoing, explained features or the explanations thereof, which can likewise be applied to the alternative arrangement.

It is to be understood that the embodiments explained above are only first designs of the shaping apparatus according to the invention. In this respect the design of the invention is not restricted to these embodiments.

The Applicants reserve the right to claim all the features disclosed in the application documents as being essential to the invention, insofar as they are novel either individually or in combination as compared with the prior art.

LIST OF REFERENCE CHARACTERS 1 apparatus
2 conveying wheel
5 stretch rod element
6 blow mould
6A first blow mould part carrier
6B second blow mould part carrier
6C pivot shaft
8 first blow moulding station or shaping station respectively
9 guide cam
10 plastics material pre-form
10A plastics material container
11 follower device
12 slide
13 base
17 cover
18 wall
19 lateral wall
20 clean room
21 further holding means
22 supply device
23 holding device
24 removal device
25 sealing device
26 carrier
27 further sealing device
28 portion
29 holding member
30 heating device
31 heating elements
32 sterilization device
34 conveying device
36 transfer unit
37 conveying wheel
40 filling device
42 transfer unit
44 conveying unit
45 stressing device
50 plant for production
51 locking device
52 first locking element
53 second locking element
55 control device
55A further control device
55B further control device
55C further control device
56 blow moulding pressure control valve
57 cylinder part
57A cylinder head part
57B cylinder base part
58 control piston part
58A tube piston element or outer tube piston element respectively
58B inner tube piston element
59 cross-section of the blow moulding air duct
60 blow moulding air duct
61 drive unit operating in an electromagnetic manner
62 axial displacement axis
63 variable stroke path length
64 volume flow of the blow moulding compressed air
65 stator winding part
66 rotor winding part
67 peripheral face
68 guide ring part
69 guide bolt part
70 external O-ring seal
71 internal seals
72 tube piston element seat
73 stop face
74 through-opening
75 cavity
76 pressure equalization chamber
77 further drive unit operating in an electromagnetic manner
78 outer component
79 inner component
80 through-opening
81 further blow moulding air duct
85 upper arrangement
86 lower arrangement
87 angle
90 wall
91 offset
92 external peripheral face
93 external diameter
94 permanent magnet element
95 plane head side
96 contoured head side 100 alternative arrangement
101 first lateral part
102 second lateral part
103 locking device
104 blow moulding nozzle
105 blow moulding piston
106 valve block
107 longitudinal direction
108 drive
L line
U environment
X axis
Y stretching direction

The invention claimed is:

1. A shaping apparatus (1) for the shaping of plastics material pre-forms (10) into plastics material containers (10A) with a plurality of blow moulding stations (8) and with at least one control device (55; 55A; 55B; 55C) for the control of blow moulding pressures and/or volume flows at the blow moulding stations (8), in which the at least one control device (55; 55A; 55B; 55C) comprises at least one control valve (56) with a control piston part (58) which is guided in a cylinder part (57) and by means of which a cross-section (59) of a blow moulding air duct (60) is capable of being closed, wherein the control device (55; 55A; 55B; 55C) has a drive unit (61; 77) operating in an electromagnetic manner in order to effect a change in position of the control piston part (58) inside the cylinder part (57) and thus also to control the blow moulding pressures and/or volume flows at the blow moulding stations (8), wherein the drive unit (61; 77) operating in an electromagnetic manner comprises a measurement and detection unit by means of which the position of the control piston part (58) is or are capable of being determined.

2. The shaping apparatus (1) according to claim 1, wherein the drive unit (61; 77) operating in an electromagnetic manner is arranged with respect to the control piston part (58) in such a way that a variable stroke path length (63) of the control piston part (58) is capable of being produced by this drive unit (61; 77) operating in an electromagnetic manner.

3. The shaping apparatus (1) according to claim 1, wherein the control piston part (58) comprises at least one tube piston element (58A) which is arranged so as to be mounted in an axially displaceable manner inside a stator winding part (65) of the drive unit (61; 77) operating in an electromagnetic manner.

4. The shaping apparatus (1) according to claim 3, wherein the tube piston element (58A) comprises a rotor winding part (66) which forms the peripheral face (67) of the control piston part (58) at least in part.

5. The shaping apparatus (1) according to claim 1, wherein the control piston part (58) is mounted so as to be axially displaceable on a guide bolt part (69) of the cylinder part (57) projecting into a tube piston element (58A).

6. The shaping apparatus (1) according to claim 1, wherein the control piston part (58) has a pressure equalization chamber (76).

7. A shaping apparatus (1) for the shaping of plastics material pre-forms (10) into plastics material containers (10A) with a plurality of blow moulding stations (8) and with at least one control device (55; 55A; 55B; 55C) for the control of blow moulding pressures and/or volume flows at the blow moulding stations (8), in which the at least one control device (55; 55A; 55B; 55C) comprises at least one control valve (56) with a control piston part (58) which is guided in a cylinder part (57) and by means of which a cross-section (59) of a blow moulding air duct (60) is capable of being closed, wherein the control device (55; 55A; 55B; 55C) has a drive unit (61; 77) operating in an electromagnetic manner in order to effect a change in position of the control piston part (58) inside the cylinder part (57) and thus also to control the blow moulding pressures and/or volume flows at the blow moulding stations (8), wherein the control piston part (58) comprises two tube piston elements (58A, 58B), wherein one of the two tube piston elements (58A, 58B) is arranged so as to be axially displaceable in the other of the two tube piston elements (58A, 58B).

8. The shaping apparatus (1) according to claim 1, wherein sealing faces acting in a sealing manner with respect to piston parts (58) are produced from a softer or harder material than the piston parts (58).

9. The shaping apparatus (1) according to claim 1, wherein a plurality of control valves (56) of at least one of the blow moulding stations (8) are capable of being controlled by means of the control device (55; 55A; 55B; 55C).

10. The shaping apparatus according to claim 1, characterized by a central controller unit, by means of which a plurality of control devices (55; 55A; 55B; 55C) are capable of being controlled.

11. A shaping apparatus (1) for the shaping of plastics material pre-forms (10) into plastics material containers (10A) with a plurality of blow moulding stations (8) and with at least one control device (55; 55A; 55B; 55C) for the control of blow moulding pressures and/or volume flows at the blow moulding stations (8), in which the at least one control device (55; 55A; 55B; 55C) comprises at least one control valve (56) with a control piston part (58) which is guided in a cylinder part (57) and by means of which a cross-section (59) of a blow moulding air duct (60) is capable of being closed, wherein the control device (55; 55A; 55B; 55C) has a drive unit (61; 77) operating in an electromagnetic manner in order to effect a change in position of the control piston part (58) inside the cylinder part (57) and thus also to control the blow moulding pressures and/or volume flows at the blow moulding stations (8), wherein the control device (55; 55A; 55B; 55C) comprises an energy storage device for storing electrical energy.

* * * * *

UNITED STATES PATENT AND TRADEMARK OFFICE
CERTIFICATE OF CORRECTION

| | | |
|---|---|---|
| PATENT NO. | : 9,266,276 B2 | Page 1 of 1 |
| APPLICATION NO. | : 14/509140 | |
| DATED | : February 23, 2016 | |
| INVENTOR(S) | : Dieter Finger et al. | |

It is certified that error appears in the above-identified patent and that said Letters Patent is hereby corrected as shown below:

Title page

Item (71) Applicant, should read: Krones AG, Neutraubling (DE)

Item (73) Assignee, should read: Krones AG, Neutraubling (DE)

Signed and Sealed this
Seventeenth Day of May, 2016

Michelle K. Lee
*Director of the United States Patent and Trademark Office*